United States Patent Office 3,565,877
Patented Feb. 23, 1971

3,565,877
REDOX POLYMERIZATION PROCESS
Sergio Lo Monaco, Mestre, and Luigi Patron, Venice, Italy, assignors to Monsanto Company, St. Louis, Mo., a corporation of Delaware
No Drawing. Filed Jan. 17, 1968, Ser. No. 698,381
Claims priority, application Italy, Jan. 17, 1967, 11,559A
Int. Cl. C08f 3/76, 15/22
U.S. Cl. 260—88.7       2 Claims

ABSTRACT OF THE DISCLOSURE

Acrylic polymers have been prepared in good yields employing a redox catalyst system composed of a mixture of hypochlorite and chlorite ions in solution activated in an oxidizable sulfoxy compound. The polymerization is enhanced by small amounts of heavy metal sequestering agents.

---

This invention relates to a novel method for the polymerization of acrylonitrile. More particularly, the instant invention relates to a process for the polymerization of acrylonitrile alone or with other monoethylenically unsaturated monomers interpolymerizable therewith wherein the polymerization is catalyzed by a novel redox catalyst system.

Redox catalyst systems are well known for initiating polymerization of acrylonitrile alone and with other monoethylenically unsaturated monomers. However, in the preparation of acrylonitrile polymers for synthetic fiber use most of the known redox catalyst systems result in polymers having one or more undesirable properties included among which are poor polymer color, instability to heat, poor dyeability, low conversion and wide molecular weight distribution.

The redox systems employing persulfate catalysts activated by sulfites have been used for commercial preparation of acrylic polymers with great success to form white, dyeable polymers and fibers. However, the dyeability of fibers produced from polymers formed using the persulfate-sulfite redox systems results largely from the presence of $-SO_3H$ and $-OSO_3H$ groups attached to the polymer chains as a result of decomposition of the initiator. While these groups are beneficial in increasing the basic dyeability of synthetic fibers, the process for manufacture of fibers employing polymers of this type tends to cause hydrolysis of some of these groups. Such hydrolysis results in variations in dyeability to the extent that the dyeability of fibers may be difficult to control.

Similarly, redox systems using chlorate ions activated by oxidizable sulfoxy compounds have been widely reported for the polymerization of acrylonitrile alone and with a variety of other monoethylenically unsaturated monomers. These systems, however, suffer drawbacks notably with respect to difficulty in controlling dyeability, the mean molecular weight and molecular weight distribution of the polymers.

Thus. it becomes an object of the instant invention to provide a novel method for the polymerization of acrylonitrile alone or in the presence of minor proportions of one or more monoethylenically unsaturated monomers interpolymerizable therewith by contacting acrylonitrile alone or in the presence of other monomers with a catalytic amount of a redox catalyst system comprising a catalyst comprising a mixture of hypochlorite ions and chlorite ions activated by an oxidizable sulfoxy compound.

While the ratio of chlorite to hypochlorite in the catalyst has not been found to constitute a critical aspect of this invention improvements in heat stability and whiteness can be observed by maintaining chlorite to hypochlorite ratios greater than 0.05 and preferably between 0.1 and 10. Above 10 the polymer properties appear to be less attractive both with respect to polymer color and stability and to heat.

Similarly, it has been found that the process is operable over a wide ratio of sulfoxy compound to chlorite-hypochlorite mixture. However, attractive yields and polymer properties are obtained only where the ratio of activator to catalyst mixture lies between 1 and 30.

In the practice of this invention the chlorite and hypochlorite ions may be charged to the reaction in the form of any compound which yields chlorite ions and hypochlorite ions in aqueous systems. Such compounds are well known and include chlorous and hypochlorous acid and the water soluble chlorites and hypochlorites of alkali and alkaline earth metals, as well as ammonium chlorites and hypochlorites. Exemplary and preferred among such water soluble salts are sodium and potassium chlorites and hypochlorites.

Oxidizable sulfoxy compounds employed in the instant invention are those normally employed as activators in redox catalyst systems for vinyl polymerization. More specifically, they include compounds containing oxygen and sulfur in which the valence of sulfur is not greater than 4. While sulfur dioxide is preferred, the activator may be added as a water soluble alkali metal or alkaline earth metal bisulfite, metabisulfite or thiosulfite, among which sodium bisulfite and potassium bisulfite are preferred.

The concentration of hypochlorite and chlorite (calculated as acid) based on the weight of total monomer employed in the process of the instant invention, generally lies between about 0.05 and 5.0 percent, concentrations between about 0.35 and 2.0 percent being preferred.

A further and important additional aspect of the instant invention lies in the discovery that, unlike redox catalyst systems such as that involving persulfate/bisulfite compounds, the presence of heavy metals, such as iron, is not required to start the polymerization. Moreover, it has been discovered the removal of even small quantities of such heavy metals from the system by addition of a heavy metal sequestering agent results in improvements in polymer color and stability to heat. When employed, such sequestering agents are used in small quantities which may range up to about 2 percent, for example from .001 percent to about 2 percent based on the weight of the monomers. However, such amounts as may be determined necessary to remove traces of heavy metals from the reaction system are used to best advantage. Typical of heavy metal sequestering agents which may be employed in the process of this invention are the water soluble salts of the ethylenediaminetetraacetic acid, diethylenetriaminepentaacetic acid and nitrilotriacetic acid, such as the di-, tri- and tetra-sodium and potassium salts, the mono- and bi-calcium and magnesium salts, the di-, tri- and tetra-ammonium salts as well as also the mixed salts of such compounds. Preferred are the ammonium salts and water soluble salts of alkali and alkaline earth metals of Groups Ia and IIa, respectively, of the periodic chart of elements found in H. G. Dening's, Fundamental Chemistry, 2nd ed., John Wiley and Sons, Inc., New York (1947).

Examples of water soluble salts of these acids include bisodium ethylenediaminetetraacetate, trisodium ethylenediaminetetraacetate, tetrasodium ethylenediaminetetraacetate and the corresponding potassium and ammonium salts, monocalcium ethylenediaminetetraacetate, dimagnesium ethylenediaminetetraacetate, tripotassium diethylenetriaminepentaacetate, pentasodium diethylenetriaminepentaacetate, calcium tripotassium diethylenetriaminepentaacetate, trisodium nitrilotriacetate, monopotassium nitrilotriacetate, sodium calcium nitriloacetate, and the like.

Concentrations of the amino polyacids greater than about 2% may be employed but do not result in further advantages. Instead, there would be only an increase of the cost of the process due both to the greater consumption of the aminopolyacids as well as to the difficulties that arise in separation and purification of the polymer.

The redox catalyst system of this invention is effective with any of the known methods used for the polymerization of acrylonitrile. Thus, the polymerization may be carried out in a heterogeneous system, such as an aqueous emulsion or dispersion in which the acrylonitrile or the mixture of ethylenically unsaturated monomers containing acrylonitrile is dispersed in a suitable medium, such as water, and if necessary or desired, with the aid of a suitable emulsifying agent. The polymerization is conducted by adding the catalyst system and monomers while stirring the reaction mass.

The process of this invention may also employ a homogeneous system in a suitable solvent in the presence of the polymerization catalyst. Moreover, the polymerization may be conducted according to any well known batch, semi-continuous or continuous procedure. The polymerization temperature may be any suitable temperature between about room tempertaure and the boiling temperature of the polymerization medium. However, in general, the temperature of the reaction is normally maintained between 40° C. and 70° C.

To ensure an optimum concentration of the catalyst, it is generally desirable to add the catalyst either continuously or intermittently during the course of the reaction. The monomers are generally fed into the reaction medium separately from the catalytic system, but may be fed either before, after or simultaneously with the catalytic system.

The preferred practice, in the case of preparations of copolymers to be used in the preparation of fibers, involves the separate and simultaneous feed-in charge of the monomers and the components of the catalytic redox system since different monomers often polymerize at different rates under any given set of conditions, it is possible in this way to check or control the composition of the copolymer obtained.

In general, the polymerization of acrylonitrile is carried out, according to this invention, under acid conditions, that is, the reaction mixture is maintained at a pH not exceeding 4, but preferably comprised between 2 and 3.5. In order to obtain optimum properties in the polymer, especially when a continuous polymerization method is applied, the pH of the reaction mixture should be kept always constant.

It is desirable to carry out the polymerization process in the absence of oxygen which has a strong inhibiting effect on the polymerization. This is customarily accomplished by blanketing the reaction mass with a suitable inert gas such as nitrogen or carbon dioxide.

The catalytic redox system of this invention is preferably employed for polymerizing acrylonitrile alone or in admixture with other monoethylenically unsaturated monomers copolymerizable therewith where the weight content of acrylonitrile is greater than 85 percent. These polymers are particularly suited for use in the manufacture of synthetic fibers, although polymers containing as little as 60 percent by weight for use in forming modacrylic fibers can also be prepared by the method of this invention.

The term "monoethylenically unsaturated polymerizable monomers" means those compounds that contain the

group, which are vinyl acetate and other vinyl esters of monocarboxylic acids having up to four carbon atoms, methyl acrylate and other alkyl acrylates having up to four carbon atoms in the alkyl radical, methyl methacrylate and other alkyl methacrylates having up to four carbon atoms in the alkyl radical, acrylic, alpha-chloro-acrylic and methacrylic acids, vinyl chloroacetate and other vinyl esters of halogen substituted monocarboxylic acids, dialkyl fumarates, maleates and crotonates having up to four carbon atoms in the alkyl radicals, styrene, alpha-methylstyrene, and other vinyl or alkenyl-substituted aromatic hydrocarbons, vinyl chloride, vinylidene chloride and other vinyl and vinylidene halides, methacrylonitrile, methyl vinyl ketone, N-vinyl carbazole, vinyl furane, and those tertiary N-heterocyclic compounds substituted with a polymerizable monoolefinic group, such as vinyl or other alkenyl, which may be employed for increasing the affinity of certain dyestuffs, such as vinyl pyridines and alkyl-substituted vinyl pyridines, vinyl or alkenyl lactams such as vinyl pyrrolidone, vinyl imidazole and alkyl-substituted vinyl imidazoles, vinyl quinolines, vinyl pyrazines, vinyl oxazoles, and vinyl benzimidazoles.

The polymers and copolymers of the acrylonitrile obtained according to the process of this invention possess a high degree of whiteness, excellent stability to heat and high basic dyeability, which dyeability remains stable after subsequent treatment with acids or after hydrolysis or when transformed into fibers, so that the fibers obtained, besides being very white and stable to heat have a high basic dyeability which remains essentially unvaried after treatment with acids.

In order to demonstrate the dyeability of the polymers and copolymers obtained, as well as for the fibers made from said polymer or copolymers dyeing was carried out at 100° C. for 2 hours with a solution containing about 7 g./liter of commercial dye C.I. Basic Blue 22 (purity about 16%). The quantity of dye fixed is then measured spectrophotometrically. This quantity is expressed in percent by weight of the polymer of fiber.

The stability of the basic dyeability of the polymer is given as loss, expressed in percentage, of the initial dyeability after treatment of the polymer with a solution of hydrochloric acid 0.001 N (pH=3) at 100° C. for 3 hours.

For comparison, a polymer of acrylonitrile prepared using a redox catalyst system of persulphate activated by sulphite, shows a loss of dyeability after treatment with hydrochloric acid 0.001 N at 100° C. for 3 hours of about 30%. In consequence thereof the fibers obtained from this polymer show a dyeability of 30% lower than that of the polymer from which they were obtained.

The intrinsic viscosity $(\eta)$, expressed in dl./gr. is determined in dimethylformamide at 25° C. by means of an Ostwald viscosimeter.

The whiteness was determined by the C.I.E. representation and color-measuring system. According to this system the color is expressed in terms of dominant wave length (DWL), purity index (PI) and brightness (B) referred to the Standard illuminant which is an emitting source corresponding to a black body at 6.200° K. Such a measurement is carried out by means of an Integrating General Electric Spectrophotometer.

The stability to heat is given by the variation of the purity index (PI) and by the brightness variation ($\Delta$B) of the sample after heating in a forced air oven at 145° C. for 8 hours for the polymer and 25 minutes for the fiber.

The following examples are given with purpose of illustrating the invention.

EXAMPLE I

Into a 3 liter polymerization reactor were continuously fed a stream of monomers comprising 91% by weight of acrylonitrile and by 9% by weight of vinyl acetate, aqueous solutions containing varying quantities, recorded in Table I, of sodium hypochlorite, sodium chlorite and sulphur dioxide partially neutralized with sodium bicarbonate to a pH of about 3.

The monomers charged amounted to 6.69 g./min. and the quantity of water was added to obtain a water/monomer ratio of 5. The polymerization temperature was maintained constant at 50° C.

Through an overflow pipe the aqueous copolymer suspension was discharged and then filtered. The copolymer thus obtained was then washed repeatedly with water, acetone and then again with water in order to eliminate all foreign substances and unreacted monomers; finally the copolymer was dried in an oven at 80° C. for 12 hours.

lonitrile and 7% methylmethacrylate, and aqueous solution containing 0.329% of sodium hypochlorite, 0.270% of sodium chlorite, 2.03% of $NaHCO_3$ and 1.50% of $SO_2$ polymerization conversion was 71.1%. The copolymer showed the following characteristics:

TABLE I

| NaClO in percent | $NaClO_2$ fed in percent | $SO_2$ fed in percent | Molar ratio $SO_2$/hypochlorite+ chlorite | Molar ratio chlorite/ hypochlorite | Conversion in percent | $\eta$ in dl./g. | Original color | | | Heat stability | | Basic dyeability in percent | Loss in dyeability in percent |
|---|---|---|---|---|---|---|---|---|---|---|---|---|---|
| | | | | | | | DWL | IP | B | IP | B | | |
| 0.162 | 0.197 | 2.78 | 10 | 1 | 70.5 | 1.48 | 570.0 | 99.1 | 95.6 | 6.9 | 7.9 | 10.2 | 0 |
| 0.205 | 0.249 | 1.76 | 5 | 1 | 69.2 | 1.55 | 569.5 | 99.0 | 95.2 | 6.8 | 7.8 | 10.0 | 0 |
| 0.270 | 0.329 | 1.50 | 3.2 | 1 | 71.3 | 1.42 | 570.2 | 98.2 | 94.6 | 7.9 | 8.8 | 10.8 | 0 |
| 0.116 | 0.284 | 3.00 | 10 | 2 | 69.2 | 1.51 | 571.2 | 99.1 | 94.9 | 6.9 | 8.2 | 10.2 | 0 |
| 0.183 | 0.536 | 2.46 | 5 | 2 | 70.5 | 1.33 | 569.0 | 98.9 | 94.8 | 7.9 | 9.2 | 10.1 | 0 |
| 0.202 | 0.494 | 1.725 | 3.2 | 2 | 70.2 | 1.55 | 570.2 | 99.0 | 95.2 | 7.3 | 9.0 | 10.3 | 0 |
| 0.208 | 0.126 | 2.69 | 10 | 0.5 | 71.3 | 1.32 | 571.3 | 99.5 | 96.1 | 6.9 | 6.6 | 10.9 | 0 |
| 0.295 | 0.179 | 1.90 | 5 | 0.5 | 70.5 | 1.47 | 569.2 | 99.2 | 95.7 | 7.3 | 8.1 | 10.2 | 0 |
| 0.368 | 0.223 | 1.52 | 3.2 | 0.5 | 69.5 | 1.40 | 570.1 | 98.9 | 95.2 | 7.3 | 7.9 | 10.8 | 0 |

EXAMPLE II

Operating according to conditions described in Example I, by continuously feeding into a 3 liter polymerization reactor a mixture of monomers comprising by weight 91% of acrylonitrile and by 9% of vinyl acetate, an aqueous mixture containing 0.154% of sodium hypochlorite based on monomers, 0.187% sodium chlorite based on monomers and 3.09% of $NaHCO_3$ based on monomers, 2.64% of $SO_2$ with respect to the monomers and 0.020% of ethylenediaminetetraacetic acid, polymerization conversion amounted to 69.6%.

The copolymer showed the following characteristics:

Intrinsic viscosity [$\eta$]—1.62 dl./g.
Basic dyeability—10.2%
Loss of dyeability after treatment with a solution of hydrochloric acid 0.001 N—0%
Dominant wave length—571.4
Purity index—99.5
Brightness—96.0
Heat stability for—
  $\Delta$ PI: 6.0
  $\Delta$ B: 6.8.

EXAMPLE III

Operating according to Example I, by continuously feeding an acrylonitrile monomer, an aqueous solution containing 0.205% of sodium hypochlorite, 0.249% of sodium chlorite, 2.11% of $NaHCO_3$ and 1.76% of $SO_2$ polymerization conversion was 71.5%. The polymer had the following characteristics:

Intrinsic viscosity—1.40 dl./g.
Basic dyeability—10.9%
Loss of dyeability—0%
Dominant wave length—570.0
Purity index—99.5
Brightness—96.1
Heat stability for—
  PI: 6.7
  B: 8.1.

EXAMPLE IV

Operating according to Example I by continuously feeding a mixture of monomers comprising 93% acry- Intrinsic viscosity—1.38 dl./g.$^{-1}$
Basic dyeability—10.8%
Loss of dyeability—0%
Dominant wave length—569.0
Purity index—98.0
Brightness—94.4
Heat stability for—
  $\Delta$ PI: 8.4
  $\Delta$ B: 10.1.

We claim:

1. In a process for the polymerization of polymers comprising at least about 60 percent by weight of acrylonitrile under redox catalyst conditions and at a pH not exceeding 4, the improvement which comprises conducting the polymerization in the presence of a mixture of any two compounds which yield chlorite ions and hypochlorite ions in aqueous systems with the chlorite to hypochlorite ratio between about 0.05 and 10 as catalyst and an oxidizable sulfoxy compound containing oxygen and sulfur in which the valence of sulfur is not greater than 4 as activator, and wherein the ratio of catalyst mixture to oxidizable sulfoxy compound is between 1 and 30.

2. The improvement of claim 1 wherein the polymerization is conducted in the presence of from .001 percent to about 2 percent based on the weight of the monomers of a sequestering agent to remove traces of heavy metals from the system.

References Cited

UNITED STATES PATENTS

| 2,751,374 | 6/1956 | Cresswell | 260—85.5D |
| 2,775,579 | 12/1956 | Erchak et al. | 260—88.7 |
| 3,141,869 | 7/1964 | Dennstedt | 260—88.7 |
| 3,186,975 | 6/1965 | Harris | 260—85.5N |
| 3,200,100 | 8/1965 | Dennstadt | 260—85.5 Orig. |
| 3,287,307 | 11/1966 | Taniyama et al. | 260—88.7 |

HARRY WONG, JR., Primary Examiner

U.S. Cl. X.R.

8—55; 260—63, 78.5, 85.5